May 7, 1968 G. S. MARX ETAL 3,381,934
CAM OPERATED VALVE

Filed Sept. 14, 1965 2 Sheets-Sheet 1

INVENTOR
GUILHERME S. MARX

BY
ATTORNEYS.

INVENTOR
GUILHERME S. MARX

BY Dennison & Dennison
ATTORNEYS.

United States Patent Office 3,381,934
Patented May 7, 1968

3,381,934
CAM OPERATED VALVE
Guilherme S. Marx, Rua Prudente de Morais 564,
Apt. 304, Rio De Janeiro, Brazil
Filed Sept. 14, 1965, Ser. No. 487,257
9 Claims. (Cl. 251—260)

ABSTRACT OF THE DISCLOSURE

A cam actuated valve including a rotary cam operable to reciprocate a valve stem within a tubular guide sleeve. The stem carries a valve head adapted to seat against a portion of the valve body, said valve head being normally urged into the seated position. The rotary cam member being in the form of a hollow cylinder and having at least one lubrication distribution hole in its wall and adapted to hold a lubricant.

---

This invention relates to new and useful improvements in valves for controlling the flow of fluids. More particularly, the invention relates to a valve construction having a rotary cam actuator and improved lubrication means.

Cam actuated valves have long been used in the art, but have never met with any degree of commercial success in the art due to several inherent problems. In many cases such valves were difficult to operate, were relatively complicated in structure, and required considerable maintenance in order to keep them in operating condition. Since there are only two main moving parts in such cam actuated valves, it is felt that it would be advantageous to provide both a means for storing lubricant and means for distributing the same throughout the moving parts and yet prevent lubricant from mixing with the fluid flowing through the valve.

The present invention overcomes the difficulties inherent in the prior art and provides a valve construction which may be readily substituted for valves in their existing installations and which may be quickly and smoothly opened or shut and may be operated through a great number of cycles with little or no wear due to its simple design and lubrication features.

An object of the present invention is to provide a valve construction incorporating a rotary cam for opening and closing the valve member.

Aother object of this invention is to provide a lubricating system for a cam actuated valve.

A still further object of the instant invention is to provide a cam actuated valve incorporating a lubricant chamber within the rotary cam body.

A further object of this invention is to provide a cam actuated valve which will reduce knock due to fluid pressure and which can be opened or closed rapidly in a smooth manner, the pressure exerted by the flowing fluid serving to assist the valve in closing.

A further object of this invention is to provide a valve construction incorporating means for adjusting the force of the valve member upon its seat without removing the valve from its installation in a pipe line.

Another important object of the present invention is to provide a fixed guide means for the valve stem in a cam actuated reciprocating valve.

A further object of this invention is to provide a cam actuated valve which is of simple construction, has a minimum number of parts, and is safe and efficient in use and which requires a minimum of maintenance.

Figure 4:
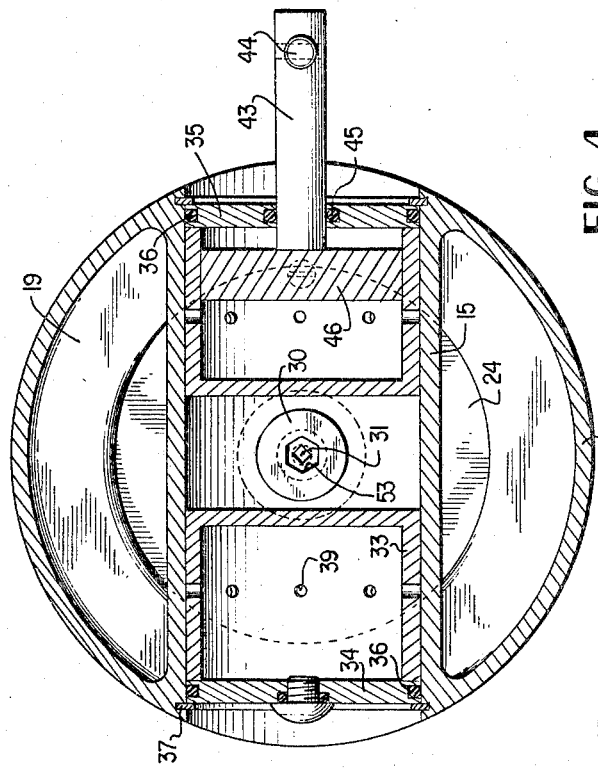
Figure 5:
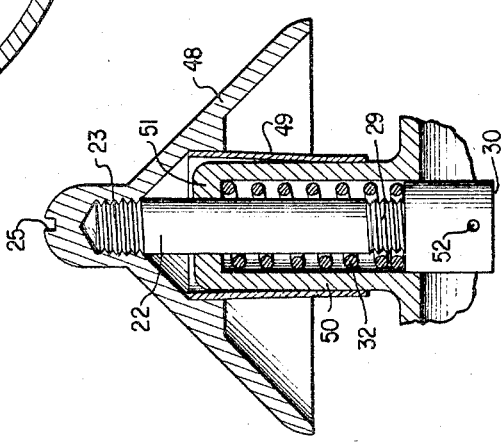
Figure 1:
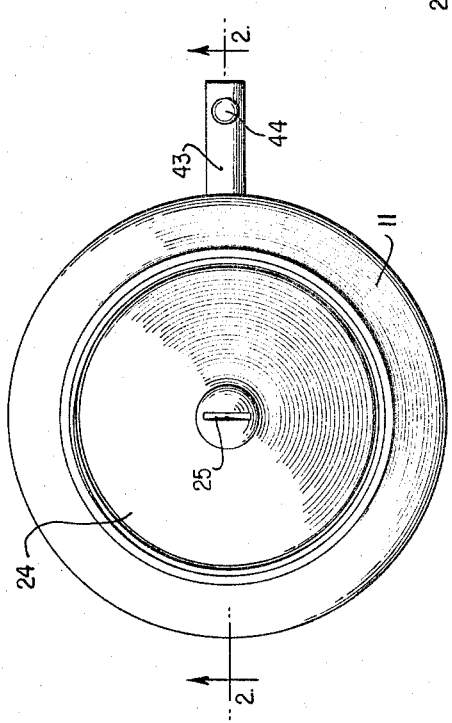
Figure 3:
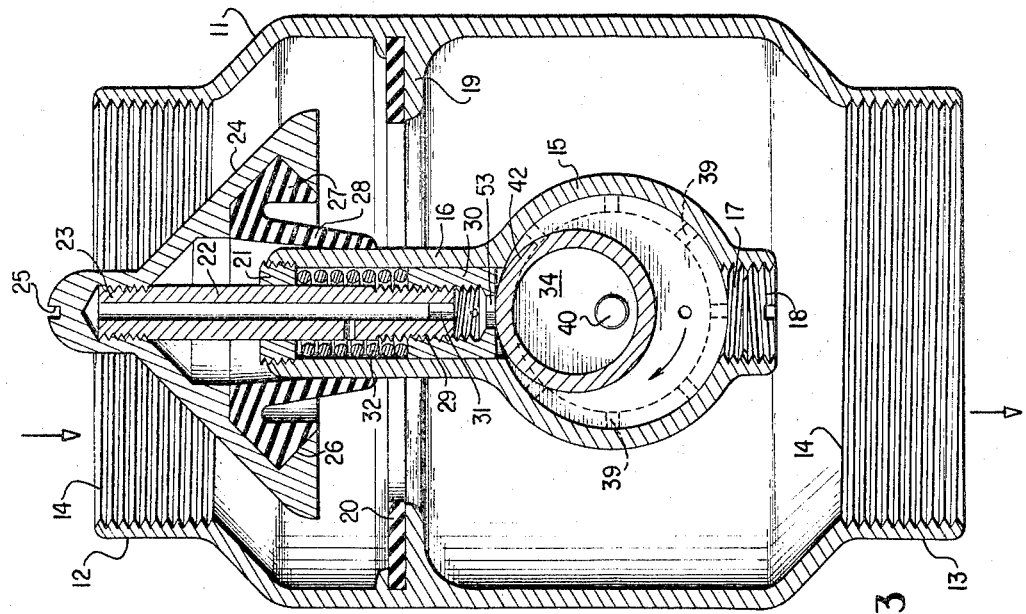
Figure 2:
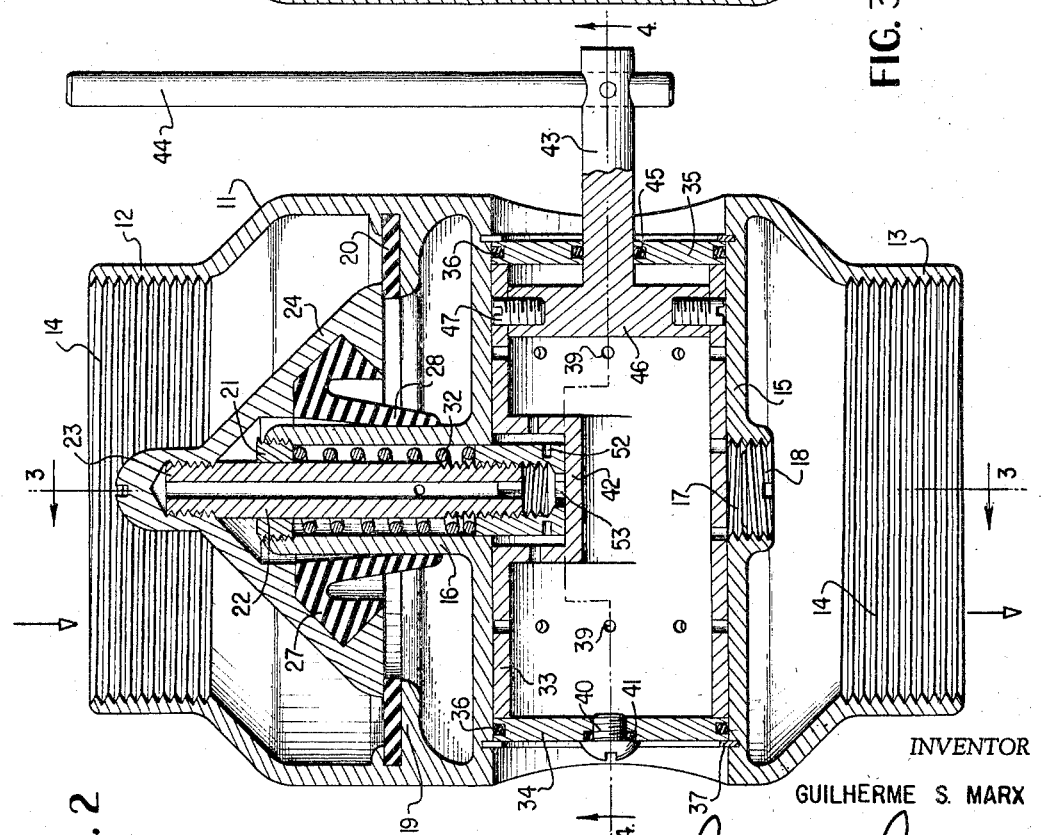

For yet other objects and for a better understanding of the invention, reference may be had to the following detailed description taken in conjunction with the accompanying drawings which illustrate the best mode now contemplated by me for carrying out my invention:

FIG. 1, is a plan view of the valve;
FIG. 2, is an enlarged vertical cross-sectional view taken along line 2—2 of FIG. 1 and showing the valve in its closed position;
FIG. 3, is a vertical sectional view taken along line 3—3 of FIG. 2, but showing the valve in its open position;
FIG. 4, is a horizontal cross-section taken along line 4—4 of FIG. 2;
FIG. 5, is a sectional view of a modification of the valve member, guide stem, and seal.

Reference is now made specifically to the drawings, wherein like reference numerals designate similar parts throughout the several views and wherein the valve assembly constituting the subject matter of this invention is designated generally at 10.

The valve assembly is adapted for installation in a conventional manner in pipe lines and comprises a valve body 11 formed of metal or plastic and having an inlet section 12 and an outlet section 13. Each of these sections may be internally threaded as shown at 14 or may be provided with external threads depending upon the particular installation.

Preferably cast integrally with the valve body is the cylindrical actuator support housing 15. If desired, this housing may be a separate member welded or otherwise secured to the wall of the valve body 11. The actuator support housing is of such a dimension with regard to the diameter of the valve body, that the fluid passing from the inlet 12 to the outlet 13 is not unduly restricted. A vertical guide tube or sleeve 16 extends upwardly from the top of the support housing and is axially aligned with the valve body. An annular valve shoulder or seat 19, located above the actuator support housing, is also cast or otherwise formed within the valve body 11. In order to insure a tight seal and to compensate for wear of the parts, a valve seat washer 20 is placed upon the seat 19. Since the instant valve is designed to operate in any position, either vertical or horizontal, or completely inverted, an annular lip on an integral groove is provided as shown in FIGURES 2 and 3 to retain the washer 20 in place on seat 19.

In the preferred form of the invention, a guide bushing 21 is removably secured within and at the top of the vertical guide tube 16. Valve stem 22 is mounted for vertical reciprocation within the bushing as shown in FIGURES 2 and 3. The upper end of stem 22 is threaded as shown at 23 for reception of the threaded nose of valve head 24. The nose may be provided with a cross slot 25 as shown in FIGURES 1 and 3 in order to facilitate assembly and disassembly of these components. The valve head is undercut as shown at 26 for reception of the rubber or plastic seal 27. Seal 27 is formed with a depending skirt portion 28 which wipes against the outer circumference of the vertical guide tube 16.

The lower end of the valve stem 22 is provided with screw threads 29 for reception of regulating nut 30. It will be noted that nut 30 is in contact with the inside wall of the vertical guide tube 16 and serves in conjunction with bushing 21 to insure proper alignment of the valve stem 22 and its associated valve head 24 during operation. As can be clearly seen in FIGURES 3 and 4, the valve stem 22 has an axial aperture terminating in a square or hex opening 31 for a purpose described in greater detail hereinafter. Interposed within the guide tube 16 and having its ends in contact with both the bushing 21 and the regulating nut 30 is a coil closure spring 32 which serves to normally bias the valve stem downwardly and hence seat the valve head against the valve seat washer 20.

With reference to FIGURES 2, 3, and 4, it will be noted that an actuator cylinder 33 is received within the actuator support housing 15. Cylinder 33 is preferably machined from metal, but may be formed of plastic, synthetic resins or the like if desired depending upon the intended use of the valve. The actuator cylinder is hollow and has its ends closed off by circular end plates 24 and 35 secured in any conventional manner to the actuator cylinder. The chamber formed by the cylinder and its end plates serves as a reservoir for lubricating oil. Rubber or synthetic O-rings 36 installed about the end plates serve to retain oil from passing to the outside of the valve. Spring retaining clips 37 fit within companion grooves 28 machined or otherwise formed in the actuator support housing 15 to restrain the actuator cylinder from endwise movement. A plurality of lubricant distributing holes 39 are formed radially through the walls of the actuating cylinder and serve to carry oil to the bearing surface between the actuator support housing 15 and the actuator cylinder 33. This oil is also free to move upwardly about the inner wall of the vertical guide tube 16 as well as within the tube and about the valve stem 22. Oil may also pass within the valve stem 22 and through the radial port. See FIGURE 2. The oil is retained from passing into the flow line by means of the skirt portion 28 of the seal member 27. Oil may be introduced into the reservoir within the actuator cylinder by removing the filler plug 40. A filler plug gasket 41 is provided to prevent leakage of lubricant past the filler plug.

The eccentric cam actuator 42 is formed as an integral part of the actuator cylinder 33 and provides a surface in contact wtih the bottom face of regulating nut 30. The entire actuator cylinder and associated eccentric cam may be manually rotated by the drive shaft 43 by means of the handle bar 44 attached to the drive shaft outer end in a conventional manner. Of course, if desired, motor means could be employed to rotate the cam. The drive shaft passes through an opening in the end plate 35 and a seal 45 is provided to prevent oil leakage. End plate 46 formed on the inner end of the drive shaft 43 is removably secured to the actuating cylinder by means of set screws 47 or the like.

A modified form for the valve head, its seal, and the vertical guide tube is shown in FIGURE 5. Here the valve head 48 is provided with a depending cylindrical tapered seal 49 which is in wiping contact with the vertical guide tube 50. The guide tube in this modification has its upper end turned inwardly as at 51 providing the annular bushing.

In operation, rotation of the handle 44 by the operator in either direction will serve to rotate the cam 42 raising valve stem 22 and causing valve head 24 to be displaced away from the valve seat washer. In order to close the valve, the handle may again be turned in either direction and due to the action of the spring 32, the valve stem 22 will move downwardly bringing the valve head 24 into contact with the valve seat washer. During closing it will be noted that the pressure of the fluid flowing through the valve will aid in the closing action due to the force it exerts downwardly against the conical valve head. Due to the particular eccentric cam design, knocking due to water pressure is vertically eliminated since the initial opening or closing takes place slowly and then suddenly increased in its action. That is, assuming a starting position of 0 degrees of the handle bar as shown in FIGURE 2, rotating the bar 45 degrees or moving it from 135 degrees to 180 degrees will not cause as much movement of the valve stem as rotating it between 45 and 135 degrees. Because of this, the valve may be opened or closed rapidly in a smooth manner.

Because of the particular lubrication structure previously mentioned, all moving parts are continually lubricated and it is only infrequently that additional lubricant must be added to the reservoir.

If it is desired to make adjustments in the space between the bottom of the valve head 24 and the seat 19, in order to compensate for wear or the like, it is not necessary that the entire valve be physically removed from its pipeline. By rotating the valve to its open position as shown in FIGURE 3 and removing the retaining clip 37 adjacent end plate 35, the entire actuator cylinder may be removed. An L-shaped tool such as an Allen wrench or the like may be inserted into the square or hex opening 31 in the valve stem and a conventional pin spanner may then be employed to rotate the regulating nut 30 through hole 52. In the alternative, a special wrench may be used and engaged in opening 53 to turn the regulating nut 30 while the Allen wrench is holding the valve stem 22 stationary. The actuating cylinder and retaining clip may then be reinstalled.

While I have shown and described a preferred embodiment of the invention, it is to be understood that the drawings and detailed disclosure are to be contrued in an illustrative rather than a limiting sense since various modifications and substitutions of equivalents may be made by those skilled in the art within the spirit and scope of this invention as defined in the appended claims.

What I claim as my invention and desire to protect by United States Letters Patent is:

1. A valve assembly comprising:
   (a) a valve body having inlet and outlet openings and an annular valve seat,
   (b) an actuator support housing in said valve body transverse to the flow axis,
   (c) a tubular guide sleeve extending upwardly from said actuator support housing and along said flow axis,
   (d) a valve stem mounted for reciprocable movement in said guide sleeve,
   (e) a valve head secured to the upper end of said valve stem and adapted to be moved into seated position against said valve seat to block flow between said inlet and outlet openings, and
   (f) rotary cam actuator means within said actuator support housing, the lower end of said valve stem being in contact with said cam actuator means, said rotary cam actuator means comprises a hollow cylinder having a circular eccentric cam surface at its midportion, said cylinder having a filler plug and serving as a reservoir for lubricant, at least one lubricant distribution hole in the wall of said cylinder permitting lubricant to flow to the outer wall of said cylinder and to its bearing surface within the actuator support housing.

2. A valve assembly as defined in claim 1 and further including resilient means for normally urging said valve head into seated position.

3. A valve assembly as defined in claim 1 and further including a guide bushing at the upper end of said guide sleeve in engagement with said valve stem and a cylindrical member at the lower end of said valve stem in contact with the inside surface of said guide sleeve.

4. A valve assembly as set forth in claim 3 wherein the lower end of said valve stem is threaded and said cylindrical member is a regulating nut adapted to be threadedly received on the threaded lower portion of said valve stem, and tool engaging means on said regulating nut whereby said nut may be engaged and turned by an appropriate tool to lengthen or shorten the effective length of said valve stem for purposes of adjustment.

5. A valve assembly as defined in claim 1 and further including annular seal means carried adjacent the ends of the cylinder and in contact with the inside wall of said actuator support housing to prevent lubricant from passing outwardly of the valve body.

6. A valve assembly as defined in claim 1 and further including manual handle bar means for rotation of said cylinder.

7. A valve assembly comprising:
   (a) a valve body having inlet and outlet openings a valve seat and a tubular actuator support housing transverse to the valve flow axis, (b) a tubular guide sleeve extending upwardly from said support housing and in communication with the interior thereof, (c) a valve head having a dependent hollow valve stem open at the bottom end received for guided reciprocable movement within said guide sleeve, said valve head adapted to me moved into seated position against said valve seat to block flow between said inlet and outlet openings, (d) a dependent skirted seal ring on said valve head in wiping contact with the outer surface of said guide sleeve, (e) a hollow cylinder rotatable within said actuator support housing adapted to store a supply of lubricant therein, a portion of the surface of said cylinder defining a cam surface and being in contact with said bottom end of said valve stem, (f) at least one lubricant distribution port in the wall of said cylinder, and (g) at least one lubricant distribution port in the wall of said hollow valve stem, whereby lubricant may pass from the inside of said cylinder, through said actuator support housing and then upwardly through said valve stem and then through the port therein to the outer surface thereof.

8. A valve assembly as defined in claim 7 and further including annular seal means carried adjacent the ends of said cylinder and in contact with the inside wall of said actuator support housing to prevent passage of lubricant outwardly of the valve body.

9. A valve assembly as defined in claim 7 wherein the valve head is undercut and the seal means comprises an annular rubber surface engaged in the undercut portion of the valve head and a skirt depending therefrom.

References Cited

UNITED STATES PATENTS

| | | | |
|---|---|---|---|
| 1,172,977 | 2/1916 | Gillen | 251—355 |
| 2,265,435 | 12/1941 | Kinzie et al. | 251—355 X |
| 2,403,029 | 7/1946 | Smith | 251—257 X |

WILLIAM F. O'DEA, *Primary Examiner.*

D. R. MATTHEWS, *Assistant Examiner.*

UNITED STATES PATENT OFFICE
CERTIFICATE OF CORRECTION

Patent No. 3,381,934

May 7, 1968

Guilherme S. Marx

It is certified that error appears in the above identified patent and that said Letters Patent are hereby corrected as shown below:

In the heading to the sheets of drawings, line 1, "G. S. MARX ETAL", each occurrence, should read -- G. S. MARX --.

Signed and sealed this 9th day of September 1969.

(SEAL)
Attest:

Edward M. Fletcher, Jr.
Attesting Officer

WILLIAM E. SCHUYLER, JR.
Commissioner of Patents